INVENTOR.
ROBERT T. FELD

United States Patent Office 3,276,460
Patented Oct. 4, 1966

3,276,460
METHOD AND APPARATUS FOR MONITORING AND CONTROLLING THE RATIO OF VAPOR VOLUME TO LIQUID VOLUME OF A FLUID
Robert T. Feld, Pitman, N.J., assignor to Mobil Oil Corporation, a corporation of New York
Filed Oct. 25, 1962, Ser. No. 233,007
8 Claims. (Cl. 137—3)

This invention relates to processes involving fluids and, more particularly, to the monitoring and controlling of the vapor/liquid ratio of a fluid.

The invention finds particular application in the blending of automotive fuels. At the present time, a fuel is blended to meet specifications regarding predetermined characteristics thereof, which may include, for example, octane number, one or more of a number of distillation points, and Reid vapor pressure.

A characteristic of a blended fuel which provides meaningful information concerning the operating behavior of the fuel, but which is not now susceptible of being automatically measured in any practical way, is the vapor/liquid ratio. This ratio for any fluid is the volume of vapor divided by the volume of liquid at a predetermined temperature and pressure with the liquid and vapor in equilibrium. At a pressure and temperature typical of an automotive fuel system in operation, the ratio is indicative of the propensity of the fuel to "vapor lock" in the engine fuel line. Thus, for any particular finished blend of gasoline, the vapor/liquid ratio should be maintained so that it does not exceed a predetermined maximum magnitude at a predetermined temperature and pressure. Typically, the maximum permissible vapor/liquid ratio may be 20 to 1 for a temperature and pressure corresponding to that of normal use of the fuel in service.

The present invention is directed toward automatically monitoring or detecting the vapor/liquid ratio of a fluid, as well as controlling the blending together or combining of fluids, for example, in accordance with a monitored vapor/liquid ratio.

In particular, the invention involves passing a fluid to be monitored to a location at which the liquid and vapor of the fluid are in equilibrium at a predetermined temperature and pressure at which it is desired to measure the vapor/liquid ratio of the fluid. The temperature of the fluid is maintained at the predetermined magnitude, and the vapor pressure is sensed and the rate of flow of the fluid either into or away from the location is varied to maintain the vapor pressure relatively constant at the predetermined magnitude. The vapor/liquid ratio of the fluid is then calculated from the flow rates of fluid into and away from the location. Alternatively, the flow rates of fluid into and away from the location are maintained fixed, and the vapor pressure is sensed and its variation from the predetermined magnitude is noted. In this instance, the predetermined magnitude is representative of a particular vapor/liquid ratio of the fluid, and the variation of the pressure from the predetermined magnitude is directly related, at least within a given range, to the variation of the ratio from the particular ratio.

To control the blending of a fluid from a number of component fluids in accordance with the sensed vapor/liquid ratio of one or more of the fluids, an error signal is developed which is representative of the deviation from a predetermined reference of the sensed vapor/liquid ratio. The error signal controls a servo motor which varies the amount of at least one component that forms a portion of the blended fluid. For example, in the case of a fuel stream to which butane is added as a component, the vapor/liquid ratio of the stream is monitored, and the servo motor is energized to vary the amount of butane that is added, thereby to render the vapor/liquid ratio of the stream relatively constant at a predetermined magnitude.

A detailed description follows of the invention described generally above, which is to be read in conjunction with the appended drawing, in which.

Figure 1:
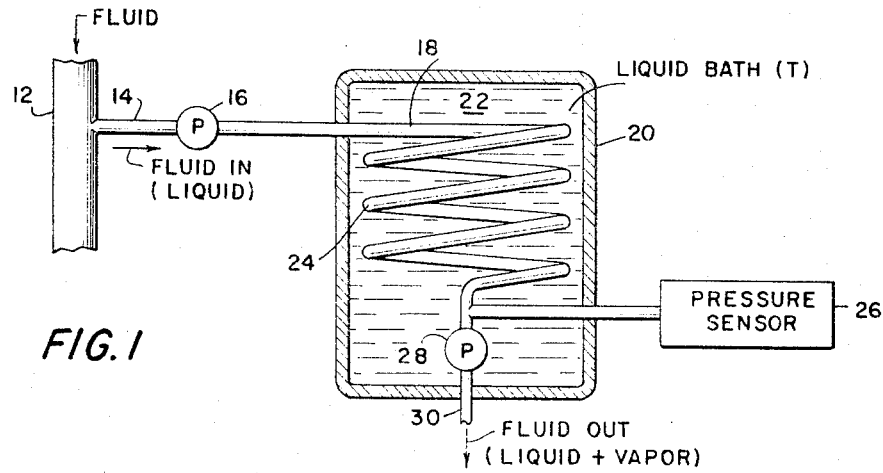
FIG. 1 is a schematic diagram of a vapor/liquid ratio monitor in accordance with the invention.

Referring to FIG. 1, a fluid to be monitored is shown flowing in a pipe 12. An inlet conduit 14 conducts the fluid to a pump 16 which pumps the fluid, typically as a liquid, into a conduit 18. The conduit 18 is enclosed within a housing 20 that contains a liquid 22 therein maintained at some predetermined temperature T at which it is desired to measure the vapor/liquid ratio of the fluid. Within the liquid 22, the conduit 18 is coiled, as at 24, and this coiled conduit portion forms a location at which evaporation of the fluid takes place and at which the vapor and the liquid of the fluid are in substantial equilibrium with each other. The pressure of the vapor in equilibrium with the liquid is sensed by a pressure sensor 26, following which the fluid is pumped by a pump 28 outwardly through an outlet conduit 30. The fluid pumped through the outlet conduit 30 is typically in the form of a liquid and a vapor.

To understand the operation of the apparatus shown in FIG. 1, the following relationships should be considered.

The vapor/liquid ratio of a fluid is defined by the following relation:

$$V/L = \frac{\text{Vapor Volume}}{\text{Liquid Volume}} \bigg]_{T_1}^{P_1} \quad (1)$$

where V and L represent the volumes of vapor and liquid, respectively, in equilibrium with each other at a predetermined pressure $P_1$ and a predetermined temperature $T_1$.

In terms of the apparatus shown in FIG. 1, relation (1) may be rewritten as follows:

$$V/L = \frac{\text{Vapor Out}}{\text{Liquid Out}} \bigg]_{T_1}^{P_1} \quad (2)$$

where Vapor Out and Liquid Out are the volumes of vapor and liquid, respectively, flowing outwardly through the outlet conduit 30 under the action of the pump 28.

Still referring to the apparatus of FIG. 1, the following relation may be written:

Fluid Out = Vapor Out + Liquid Out   (3)

where Fluid Out is the volume of the mixture of vapor and liquid being pumped outwardly through the outlet conduit 30 by the pump 28.

Solving for the quantity Vapor Out in relation (3), and substituting this into relation (2), relation (2) may be rewritten as follows:

$$V/L = \frac{\text{Fluid Out} - \text{Liquid Out}}{\text{Liquid Out}} \Big]_{T_1}^{P_1} \quad (4)$$

The following relation exists for all fluids flowing through the apparatus of FIG. 1:

$$\text{Liquid Out} = \text{Liquid In} - \text{Liquid Evaporated} \quad (5)$$

where Liquid In is the volume of liquid pumped inwardly by the pump 16 and Liquid Evaporated is the volume of liquid that is evaporated within the coiled conduit section 24 to form vapor that is in substantial equilibrium with the liquid remaining within the conduit section.

The liquid evaporated to form vapor within the coiled conduit section 24 may be related to the liquid pumped by the pump 16 as follows:

$$\text{Liquid Evaporated} = A \, (\text{Liquid In}) \Big]_{T_1}^{P_1} \quad (6)$$

where A is a factor having a magnitude between zero and unity that is related to the fluid composition and which represents the vaporization characteristic of the fluid at a pressure $P_1$ and a temperature $T_1$.

Substituting from relation (6) into relation (5), the following relation is developed:

$$\text{Liquid Out} = \text{Liquid In} - A \, (\text{Liquid In}) \Big]_{T_1}^{P_1} \quad (7)$$

Since normally a fairly small quantity of liquid produces a relatively large volume of vapor, the volume of liquid pumped outwardly through the outlet conduit 30 is substantially equal to the volume of liquid pumped into the apparatus by the pump 16. Stated in another way, the factor A in relation (6) is typically a very small number. For many fluids handled by the apparatus of FIG. 1, and particularly when the vapor/liquid ratio level in interest is relatively low, the factor A in relation (7) may be taken to be equal to zero, in which case relation (7) is reduced to the following relation:

$$\text{Liquid Out} = \text{Liquid In} \Big]_{T_1}^{P_1} \quad (8)$$

Substituting from relation (8) into relation (4), the following relation is developed:

$$V/L = \frac{\text{Fluid Out} - \text{Liquid In}}{\text{Liquid In}} \Big]_{T_1}^{P_1} \quad (9)$$

As may be noted, relation (9) relates the vapor/liquid ratio of a fluid at a predetermined pressure $P_1$ and temperature $T_1$ to the fluid pumped by the inlet and outlet pumps 16 and 28, respectively.

Figure 2:
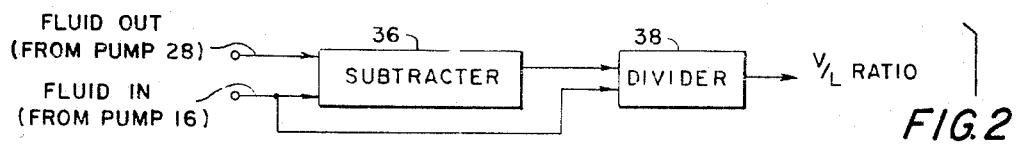
FIG. 2 is a block diagram of electrical apparatus employed in conjunction with the apparatus of FIG. 1 to determine the vapor/liquid ratio of a fluid.

Turning to FIG. 2, there is shown a circuit for instrumenting relation (9). A signal from the pressure sensor 26 is applied to subtracter 32 to which is also applied a reference signal representative of the predetermined pressure $P_1$ at which it is desired to detect the vapor/liquid ratio of the fluid. The reference signal $P_1$ may be generated by any standard source, such as a battery (not shown), for example. Naturally, the reference signal $P_1$ may be varied.

The signal from the subtracter 32 is, therefore, representative of the deviation of the vapor pressure from that established for the test, and this signal is applied as an error signal to a servo motor 34. The servo motor may be coupled to either one of the pumps 16 and 28, although in this instance it is shown coupled to the pump 28. Because the volume of fluid pumped by the pump 28 is much greater than that pumped by the pump 16, minor variations in the speed of the former pump do not affect the calculations involved as much as do variations in the speed of the pump 16.

Accordingly, the pumping rate of the pump 28 is varied so that the vapor pressure in the looped conduit section 24 is maintained relatively constant and fixed at the predetermined reference pressure $P_1$. It should be noted that the temperature $T_1$ is maintained constant by the liquid 22 in the housing 20, which may be supplied from any constant temperature source (not shown).

A signal from the pump 28, representative of the pumping rate of the pump and thus of the flow of fluid outwardly through the conduit 30, is applied to a subtracter 36. Also applied to the subtracter is a signal from the pump 16, which is representative of the pumping rate of that pump and thus of the flow of fluid, i.e., liquid, into the conduit 18. The output signal from the subtracter 36 is therefore representative of the numerator of the fraction in relation (9), and this signal is applied to a divider 38.

Also applied to the divider 38 is the signal from the pump 16, representative of the denominator of the fraction of relation (9). The signal from the divider thus is representative of the fraction of relation (9)., i.e., the vapor/liquid ratio of the fluid flowing in the pipe 12. This signal is continuous and reflects changes in the vapor/liquid ratio of the fluid in the pipe 12 as soon as they occur.

As explained above with regard to relation (8), it was assumed that the volume of liquid pumped by the pump 28 is equal to the volume of liquid pumped by the pump 16, and, therefore, that the factor A of relation (7) is equal to zero. For fluids particularly of relatively low vapor/liquid ratios, this assumption introduces very little error. However, in certain instances the error may be appreciable. For example, where the fluid vaporized within the conduit section 24 is 100% pentane, and the pressure is maintained at atmospheric pressure and the temperature is that typically prevalent in use of the fluid as an automotive fuel, for example, from 100° F. to 150° F., one volume of vapor is produced from 1/197 volume of liquid. Therefore, for a vapor volume of 20 for each volume of liquid, i.e., for a vapor/liquid ratio of 20 to 1, for example, the volume of liquid flowing out of the outlet conduit 30 is diminished from the volume of liquid pumped by the pump 16 by an amount 20/197 (Liquid In). The error introduced is therefore 20/197(100)% or roughly 10%, and, as may be seen from relation (7), A is equal to 20/197. Thus, the factor A may be expressed in terms of the vapor/liquid ratio of the fluid as follows:

$$A = \frac{V/L}{E} \quad (10)$$

where E is the volume of vapor produced by the fluid under test for each volume of liquid at the predetermined pressure and temperature.

Accordingly, where the assumption of relation (8) leads to an appreciable error, relation (7) may be substituted into relation (4) to develop the following relation:

$$V/L = \frac{\text{Fluid Out} - \text{Liquid In} + A(\text{Liquid In})}{\text{Liquid In} - A(\text{Liquid In})} \quad (11)$$

Figure 3:
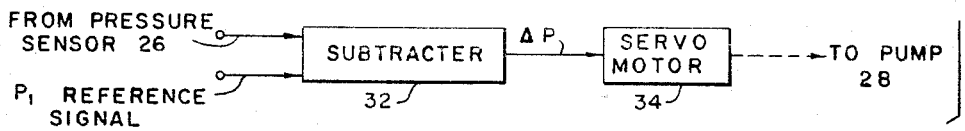
FIG. 3 is a block diagram of further electrical apparatus useful in conjunction with the apparatus of FIGS. 1 and 2.
Figure 3:
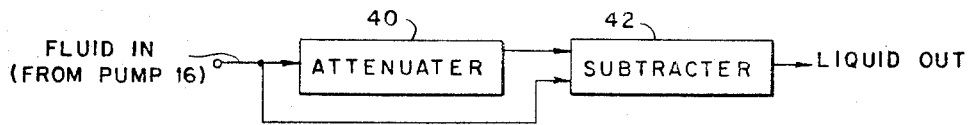

The apparatus of FIG. 3 carries out the calculations of relation (11). Referring to that figure, the signal from the pump 16 is applied to an attenuator 40, which may be a simple potentiometer (not shown) that develops a signal representative of a predetermined fraction of the input signal, i.e., the factor A(Liquid In). The attenuation quantity A, which is defined in relation (10), may be chosen to match fluid composition.

The signal from the attenuator 40 is applied to a subtracter 42 which is also supplied with the signal from the pump 16. The output signals from the subtracter 42 is representative of the flow of fluid into the apparatus of FIG. 1 minus a predetermined fraction of that flow. This signal, then, is representative of the factor Liquid In—$A$(Liquid In)

and may be taken to represent more accurately the flow of liquid through the outlet conduit 30 than the unmodified signal from the pump 16.

The signal from the subtracter 42 is applied to the subtracter 36 of FIG. 2 to replace the signal from the pump 16. In this case, the output signal from the divider 38 is representative of the expression of relation (11).

In an alternative mode of operation of the apparatus of FIG. 1, the pumps 16 and 28 may be set at predetermined fixed settings to provide predetermined rates of fluid flow therethrough. In this case, the apparatus of FIGS. 2 and 3 is not employed and the signal from the pressure sensor 26 provides a direct indication of the vapor/liquid ratio of the fluid in the pipe 12. This involves an approximation which recognizes that, for a predetermined vapor/liquid ratio established at a predetermined pressure and temperature, there are corresponding rates of fluid flow through the pumps 16 and 28. Thus, with the pumps 16 and 28 set to establish these rates of fluid flow, as long as the pressure indicated by the pressure sensor 26 conforms to the predetermined pressure, it is known that the vapor/liquid ratio of the fluid remains constant at the predetermined ratio. Variation of the signal from the pressure sensor 26, therefore, is indicative of variation of the vapor/liquid ratio of the fluid from the predetermined ratio and, within a certain range, the pressure sensor signal is directly related to the vapor/liquid ratio of the fluid. The pressure sensor 26, accordingly, may be calibrated to provide an indication of the ratio.

Figure 4:
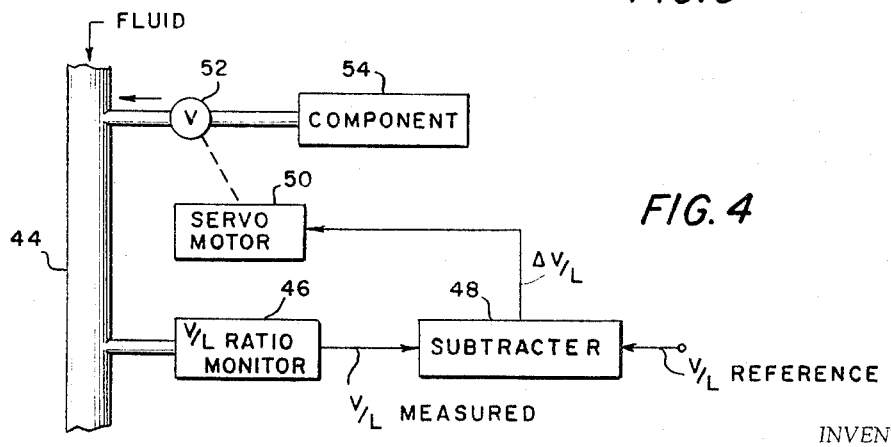
FIG. 4 is a block diagram of a system in accordance with the invention for monitoring and controlling the vapor/liquid ratio of a fluid.

FIG. 4 shows an automatic monitoring and blending system in accordance with the invention. As shown by the arrow at the top of the figure, a fluid flows in a conduit 44 and is monitored by a vapor/liquid ratio monitor 46 as described above. A signal representative of the vapor/liquid ratio of the fluid is applied to a subtracter 48. Also applied to the subtracter 48 is a reference signal representative of the vapor/liquid ratio at which it is desired to maintain the fluid. This reference signal may be generated in a fashion similar to that in which the reference signal $P_1$ in the apparatus of FIG. 2 is generated.

The output signal from the subtracter 48, then, is representative of the deviation of the vapor/liquid ratio of the fluid from that desired. This signal is applied as an error signal to a servo motor 50 which is used to control the setting of a valve 52 that meters the flow of a component, such as butane, for example, from a component source 54 that is allowed to flow into the conduit 44. As FIG. 4 shows, the vapor/liquid ratio monitor 46 is coupled to the line 44 at a location downstream of the location at which the butane or other component affecting the ratio of vapor volume to liquid volume of the finished product is added to the conduit 44. The valve 52 is varied until the error signal is reduced to zero, and in this fashion the fluid is continuously monitored and is combined with the component to meet a predetermined specification regarding vapor/liquid ratio.

Thus, there have been described exemplary embodiments for carrying out the monitoring and blending of a fluid in accordance with vapor/liquid ratio. It will be understood by those skilled in the art that the above-described embodiments are merely exemplary and that they are susceptible of modification and variation without departing from the spirit and scope of the invention. Accordingly, the invention is not deemed to be limited except as it is defined in the following claims.

I claim:
1. In apparatus for monitoring the ratio of vapor volume to liquid volume of a fluid, means for conveying the fluid to a location at which the vapor and the liquid of the fluid are in substantial equilibrium, means for conveying the fluid away from said location, means for varying at least one of the rates of flow of fluid to and from said location to retain the pressure of said vapor substantially equal to a predetermined reference, means for generating a first signal representative of the flow of fluid to said location, means for generating a second signal representative of the flow of fluid away from said location, means for subtracting said first and second signals to generate a third signal, and means for dividing said third signal by said first signal to generate an output signal representative of the ratio of vapor volume to liquid volume of said fluid.

2. In apparatus for monitoring the ratio of vapor volume to liquid volume of a fluid, means for conveying the fluid to a location at which the vapor and the liquid of the fluid are in substantial equilibrium, means for conveying the fluid away from said location, means for varying at least one of the rates of flow of fluid to and from said location to retain the pressure of said vapor substantially equal to a predetermined reference, means for generating a first signal representative of the flow of fluid to said location, means for attenuating said first signal, means for subtracting said first signal and said attenuated first signal to generate a modified first signal, means for generating a second signal representative of the flow of fluid away from said location, means for subtracting said modified first signal and said second signal to generate a third signal, and means for dividing said third signal by said modified first signal to generate an output signal representative of the ratio of vapor volume to liquid volume of said fluid.

3. In apparatus for monitoring the ratio of vapor volume to liquid volume of a motor fuel including a plurality of hydrocarbons, means for conveying the fuel to a location at which the vapor and the liquid of the fuel are in substantial equilibrium at a predetermined temperature, means for conveying the fuel away from said location, means for varying at least one of the rates of flow of fuel to and from said location to retain the pressure of said vapor substantially equal to a predetermined reference, means for generating a first signal representative of the flow of fuel to said location, means for generating a second signal representative of the flow of fuel away from said location, and calculating means responsive to said first and second signals for generating an output signal representative of the ratio of vapor volume to liquid volume of said fuel.

4. In a method of monitoring the ratio of vapor volume to liquid volume of a motor fuel including a plurality of hydrocarbons, the steps of conveying the fuel to a location at which the vapor and the liquid of the fuel are in substantial equilibrium at a predetermined temperature, conveying the fuel away from said location, varying at least one of the rates of flow of fuel to and from said location to retain the pressure of said vapor substantially equal to a predetermined value, generating a first signal representative of the flow of fuel to said location, generating a second signal representative of the flow of fuel away from said location, and generating an output signal responsive to said first and second signals and representative of the ratio of vapor volume to liquid volume of said fuel.

5. In the method recited in claim 4, the further step of controlling the composition of said fuel to maintain said ratio of vapor volume to liquid volume at a predetermined value.

6. In apparatus for making a gasoline substance by combining at least two ingredient substances at least one of which ingredient substances is susceptible of variation so as to affect the ratio of vapor volume to liquid volume of said gasoline substance, means for sensing the ratio of vapor volume to liquid volume of at least one of said substances, means for maintaining said one of said substances at a predetermined temperature and constant pressure during said sensing, and means responsive to said sensed ratio for controlling the ratio of vapor volume to liquid volume of said gasoline substance.

7. Apparatus as recited in claim 6 in which the means responsive to said sensed ratio includes means for controlling the proportions of said ingredient substances combined to make said gasoline substance.

8. Apparatus as recited in claim 6 in which said one of said ingredient substances is combined with another of said ingredient substances at a first location to form a flowing stream and said means for sensing the ratio of vapor volume to liquid volume samples said stream at a second location downstream of said first location.

References Cited by the Examiner

UNITED STATES PATENTS

| | | | |
|---|---|---|---|
| 2,311,532 | 2/1943 | Gershon | 137—88 |
| 2,671,343 | 3/1954 | Jacobs et al. | 73—53 |
| 2,722,826 | 11/1955 | Milligan | 73—53 |
| 3,037,375 | 6/1962 | Jacobs et al. | 73—53 |

M. CARY NELSON, *Primary Examiner.*

MARTIN P. SCHWADRON, *Examiner.*

R. MASSENGILL, J. O'NEILL, *Assistant Examiners.*